United States Patent
Watanabe

(10) Patent No.: US 11,156,931 B2
(45) Date of Patent: Oct. 26, 2021

(54) POSITIVELY CHARGED TONER FOR ELECTROSTATIC-IMAGE DEVELOPMENT

(71) Applicant: KAO CORPORATION, Tokyo (JP)

(72) Inventor: Shogo Watanabe, Izumiotsu (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/637,872

(22) PCT Filed: Aug. 13, 2018

(86) PCT No.: PCT/JP2018/030174
§ 371 (c)(1),
(2) Date: Feb. 10, 2020

(87) PCT Pub. No.: WO2019/035435
PCT Pub. Date: Feb. 21, 2019

(65) Prior Publication Data
US 2021/0149318 A1    May 20, 2021

(30) Foreign Application Priority Data

Aug. 17, 2017 (JP) .............................. JP2017-157668

(51) Int. Cl.
G03G 9/08 (2006.01)
G03G 9/087 (2006.01)
C08K 5/103 (2006.01)
G03G 9/097 (2006.01)
G03G 9/113 (2006.01)

(52) U.S. Cl.
CPC .......... G03G 9/08755 (2013.01); C08K 5/103 (2013.01); G03G 9/0802 (2013.01); G03G 9/0819 (2013.01); G03G 9/08711 (2013.01); G03G 9/08782 (2013.01); G03G 9/09725 (2013.01); G03G 9/1139 (2013.01)

(58) Field of Classification Search
CPC ............. G03G 9/09725; G03G 9/1139; G03G 9/0819; G03G 9/08782
USPC ...................................................... 430/108.7
See application file for complete search history.

(56) References Cited

U.S. PATENT DOCUMENTS

| 2003/0022087 A1 | 1/2003 | Tachi et al. |
| 2004/0229145 A1* | 11/2004 | Lee .................... G03G 9/08797 430/108.6 |
| 2015/0153667 A1 | 6/2015 | Noji et al. |

FOREIGN PATENT DOCUMENTS

| JP | 8-123073 A | 5/1996 |
| JP | 2001-154402 A | 6/2001 |
| JP | 2003-302786 A | 10/2003 |
| JP | 2008-58395 A | 3/2008 |
| JP | 2010-128312 A | 6/2010 |
| JP | 2010-145550 | 7/2010 |
| JP | 2010-160229 A | 7/2010 |

OTHER PUBLICATIONS

Search Report dated Sep. 18, 2018 in PCT/JP2018/030174 filed on Aug. 13, 2018, citing references AA and and AO-AS therein, 2 pages.
Extended European Search Report dated Mar. 5, 2021 in European Patent Application No. 18846623.9, citing documents AA and AO therein, 8 pages.

* cited by examiner

Primary Examiner — Mark A Chapman
(74) Attorney, Agent, or Firm — Oblon, McClelland, Maier & Neustadt, L.L.P.

(57) ABSTRACT

A positively charged toner for development of an electrostatic image, containing matrix particles containing at least a binder resin and a release agent, coated with inorganic fine particles, the binder resin containing a crystalline resin, the release agent containing ester wax (W) containing a dipentaerythritol unit as a constitutional component, the inorganic fine particles containing positively charged silica (S1) and negatively charged silica (S2), and the positively charged silica (S1) having an average particle diameter that is smaller than an average particle diameter of the negatively charged silica (S2), and the negatively charged silica (S2) having an average particle diameter of 10 nm or more and 90 nm or less.

20 Claims, No Drawings

POSITIVELY CHARGED TONER FOR ELECTROSTATIC-IMAGE DEVELOPMENT

TECHNICAL FIELD

The present invention relates to a positively charged toner for development of an electrostatic image, which is used for development of a latent image formed in an electrophotographic method, an electrostatic recording method, an electrostatic printing method, and the like.

BACKGROUND ART

In the field of electrophotography, there is a demand of a toner for electrophotography that is adaptive to increased image quality and increased operation speed associated with the progress of the electrophotographic systems. Toners include a negatively charged toner and a positively charged toner. An electrophotographic device using a positively charged toner is being favorably used in recent years due to the less amount of ozone generation, no odor caused by ozone generation, and the good charging property.

JP 2010-128312 (PTL 1) describes, for providing a positively charged toner for development of an electrostatic image excellent in the initial printing capability and the endurance printing capability, a positively charged toner for development of an electrostatic image containing colored resin particles containing a binder resin, a colorant, and a charge controlling agent, and an external additive, in which the external additive contains an external additive A and an external additive B, the external additive A is a fatty acid alkali metal salt particles or fatty acid alkaline earth metal salt particles having a number average primary particle diameter of from 0.1 to 1 μm, and the external additive B is spherical silica fine particles having a number average primary particle diameter of from 40 to 200 nm and a sphericity of from 1 to 1.3.

SUMMARY OF INVENTION

The present invention relates to a positively charged toner for development of an electrostatic image shown below.

A positively charged toner for development of an electrostatic image, containing matrix particles containing at least a binder resin and a release agent and being coated with inorganic fine particles, wherein:

the binder resin contains a crystalline resin, the release agent contains ester wax (W) containing a dipentaerythritol unit as a constitutional component, and the inorganic fine particles contain positively charged silica (S1) and negatively charged silica (S2), provided that the positively charged silica (S1) has an average particle diameter that is smaller than an average particle diameter of the negatively charged silica (S2), and the negatively charged silica (S2) has an average particle diameter of 10 nm or more and 90 nm or less.

DESCRIPTION OF EMBODIMENT

The positively charged toner for development of an electrostatic image of the present invention contains matrix particles containing at least a binder resin and a release agent and being coated with inorganic fine particles, in which the binder resin contains a crystalline resin, the release agent contains ester wax (W) containing a dipentaerythritol unit as a constitutional component, and the inorganic fine particles contain positively charged silica (S1) and negatively charged silica (S2), provided that the positively charged silica (S1) has an average particle diameter that is smaller than the average particle diameter of the negatively charged silica (S2) and the negatively charged silica (S2) has an average particle diameter of 10 nm or more and 90 nm or less.

The technique described in PTL 1 has been demanded to be further improved from the standpoint of the low-temperature fusing property and the black solid image uniformity.

The present inventors have found that the use of ester wax (W) containing a dipentaerythritol unit as a constitutional component as a release agent can provide a toner excellent in the low-temperature fusing property. However, the present inventors have also found that in the case where the ester wax (W) of this type is used as a release agent, positively charged silica attached as an external additive to the toner tends to be desorbed, and the image density in printing a black solid image is decreased particularly under a low temperature and low humidity environment, resulting in inferior black solid image uniformity. As a result of further earnest investigation by the present inventors, it has been found that the combination use of positively charged silica and negatively charged silica having particular average particle diameters can provide a positively charged toner for development of an electrostatic image excellent in the low-temperature fusing property and the black solid image uniformity.

The mechanism that the toner of the present invention is excellent in the low-temperature fusing property and the black solid image uniformity is not be necessarily clear, but can be estimated as follows.

In the case where the ester wax (W) is used as a release agent, the crystalline resin as the binder resin becomes readily crystallized under the influence of the dipentaerythritol structure of the ester wax (W), and the low-temperature fusing property is improved. On the other hand, the dipentaerythritol structure of the ester wax (W) tends to withdraw electrons due to the structure thereof having plural ester groups existing locally on the center side of the molecule, and thereby there is a tendency that the center side of the molecule is negatively charged, whereas the outer side thereof is positively charged, resulting in exhibition of positive charging behavior by the ester wax (W) by itself. Accordingly, it is considered that the ester wax (W) and the positively charged silica are repulsive to each other, and thereby the positively charged silica attached as an external additive to the toner tends to be desorbed. In the present invention, by the combination use of positively charged silica and negatively charged silica having particular average particle diameters, the negatively charged silica negates the positive charge of the ester wax (W) to prevent the positively charged silica from being desorbed, thereby improving the black solid image uniformity.

The definitions and the like of the terms in the description herein are shown below.

Whether a resin is crystalline or amorphous is determined by a crystallinity index. The crystallinity index is defined by the ratio of the softening point and the maximum endothermic peak temperature (softening point (° C.)/maximum endothermic peak temperature (° C.)) of the resin in the measurement method shown in the examples described later. The "crystalline resin" means a resin that has a crystallinity index of 0.6 or more and 1.4 or less. The "amorphous resin" means a resin that has a crystallinity index of less than 0.6 or more than 1.4. The maximum endothermic peak temperature means the temperature of the peak that is on the highest temperature side among the endothermic peaks observed in the differential scanning calorimetry. The crystallinity index can be appropriately controlled by the kinds and the ratio of the raw material monomers, and the production conditions, such as the reaction temperature, the reaction time, and the cooling rate.

In the description herein, the carboxylic acid component for the polyester resin includes, not only the compound itself, but also an anhydride thereof capable of forming an acid through decomposition during the reaction and an alkyl ester of each of carboxylic acids in which the alkyl moiety has 1 to 3 carbon atoms.

The "(meth)acrylic acid" means at least one selected from the group consisting of acrylic acid and methacrylic acid. The "(meth)acrylate" means at least one selected from the group consisting of an acrylate and a methacrylate.

The "volume median particle diameter $D_{50}$" means the particle diameter where the cumulative volume frequency calculated based on volume fraction reaches 50% from the small particle diameter side. The volume median particle diameter $D_{50}$ may be measured with a laser diffraction particle diameter measurement apparatus.

<Binder Resin>

The binder resin used in the present invention contains a crystalline resin (which may be hereinafter referred to as a "crystalline resin C" or simply to as a "resin C") from the standpoint of the low-temperature fusing property. The binder resin used in the present invention preferably further contains an amorphous resin (which may be hereinafter referred to as an "amorphous resin A" or simply to as a "resin A") from the standpoint of the low-temperature fusing property, the heat resistant storage stability, and the charging capability.

<Amorphous Resin A>

Examples of the amorphous resin A include a styrene-acrylic resin and an amorphous polyester resin. Examples thereof also include an amorphous polyester based resin, such as an amorphous composite resin having a polyester resin segment and an addition polymer resin segment. The amorphous resin A is preferably at least one kind of a resin selected from a styrene-acrylic resin, an amorphous polyester resin, and an amorphous composite resin having a polyester resin segment and an addition polymer resin segment, and more preferably at least one kind of a resin selected from an amorphous polyester resin and an amorphous composite resin having a polyester resin segment and an addition polymer resin segment.

[Styrene-Acrylic Resin]

The raw material monomer of the styrene-acrylic resin is preferably a known radical polymerizable monomer including a styrene compound and an alkyl(meth)acrylate.

Examples of the styrene compound include styrene, α-methylstyrene, 2-methylstyrene, vinyltoluene, and chlorostyrene, and styrene is preferred.

Examples of the alkyl(meth)acrylate include methyl (meth)acrylate, ethyl(meth)acrylate, n-propyl or isopropyl (meth)acrylate, n-butyl, isobutyl, or tert-butyl(meth)acrylate, octyl(meth)acrylate, 2-ethylhexyl(meth)acrylate, decyl (meth)acrylate, and dodecyl(meth)acrylate. The alkyl(meth)acrylate means an alkyl ester of acrylic acid, methacrylic acid, or a mixture thereof.

The number of carbon atoms of the alkyl group in the alkyl(meth)acrylate is preferably 1 or more, more preferably 2 or more, further preferably 3 or more, and still further preferably 4 or more, from the standpoint of the low-temperature fusing property. The number of carbon atoms thereof is preferably 12 or less, more preferably 8 or less, further preferably 6 or less, and still further preferably 4 or less, from the standpoint of the heat resistant storage stability. The alkyl(meth)acrylate is preferably butyl acrylate, and more preferably n-butyl acrylate.

Examples of the other polymerizable monomer include a vinyl ester, such as vinyl acetate; and a vinyl ether, such as vinyl methyl ether.

The raw material monomer of the styrene-acrylic resin may contain a small amount of a polyfunctional monomer for the purpose of improving the high temperature offset resistance. Examples of the polyfunctional monomer include a compound having two or more polymerizable double bonds. Examples of the compound having two or more polymerizable double bonds include an aromatic divinyl compound, such as divinylbenzene and divinylnaphthalene; a carboxylate ester having two double bonds, such as ethylene glycol diacrylate; a divinyl compound, such as divinylaniline, divinyl ether, divinyl sulfide, and divinyl sulfone; and a compound having three or more vinyl groups.

The content of the styrene compound is preferably 50% by mass or more, more preferably 60% by mass or more, further preferably 70% by mass or more, and still further preferably 75% by mass or more, in the raw material monomer, from the standpoint of the heat resistant storage stability. The content thereof is preferably 95% by mass or less, more preferably 90% by mass or less, and further preferably 88% by mass or less, from the standpoint of the low-temperature fusing property.

The content of the alkyl(meth)acrylate is preferably 5% by mass or more, more preferably 10% by mass or more, and further preferably 12% by mass or more, in the raw material monomer, from the standpoint of the low-temperature fusing property, and is preferably 50% by mass or less, more preferably 40% by mass or less, further preferably 30% by mass or less, and still further preferably 25% by mass or less, therein, from the standpoint of the heat resistant storage stability.

[Amorphous Polyester Resin]

(Alcohol Component)

Examples of the alcohol component include an aromatic polyol compound and an aliphatic polyol compound. Among them, an aromatic polyol compound is preferred.

The aromatic polyol compound is preferably an alkylene oxide adduct of bisphenol A, and more preferably an alkylene oxide adduct of bisphenol A represented by the formula (I):

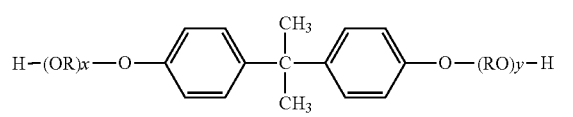

(I)

wherein RO and OR each represent an oxyalkylene group; R represents at least one kind selected from an ethylene group and a propylene group; and x and y each represent an average addition molar number of the alkylene oxide, and each represent a positive number, provided that the sum value of x and y is 1 or more, and preferably 1.5 or more, and is 16 or less, preferably 8 or less, and more preferably 4 or less.

Examples of the alkylene oxide adduct of bisphenol A represented by the formula (I) include a propylene oxide adduct of 2,2-bis(4-hydroxyphenyl)propane and an ethylene oxide adduct of 2,2-bis(4-hydroxyphenyl)propane. These compounds may be used alone or as a combination of two or more kinds thereof.

The content of the alkylene oxide adduct of bisphenol A represented by the formula (I) is preferably 70% by mol or more, more preferably 90% by mol or more, and further preferably 95% by mol or more, is preferably 100% by mol or less, and is further preferably 100% by mol, in the alcohol component.

Examples of the aliphatic polyol compound include an aliphatic diol having 2 or more and 20 or less carbon atoms and a trihydric or higher aliphatic alcohol, such as glycerin.

The number of carbon atoms of the aliphatic diol is preferably 2 or more, more preferably 4 or more, further preferably 6 or more, still further preferably 9 or more, and still more further preferably 11 or more, and is preferably 20 or less, more preferably 16 or less, and further preferably 14 or less.

Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol. These compounds may be used alone or as a combination of two or more kinds thereof.

(Carboxylic Acid Component)

Examples of the carboxylic acid component include an aromatic dicarboxylic acid and an aliphatic dicarboxylic acid.

Examples of the aromatic dicarboxylic acid include phthalic acid, isophthalic acid, and terephthalic acid. Among these, terephthalic acid and isophthalic acid are preferred, and terephthalic acid is more preferred. These compounds may be used alone or as a combination of two or more kinds thereof.

The content of the aromatic dicarboxylic acid is preferably 10% by mol or more, more preferably 30% by mol or more, and further preferably 50% by mol or more, may be 100% by mol or less, and is preferably 90% by mol or less, in the carboxylic acid component.

The number of carbon atoms of the aliphatic dicarboxylic acid is preferably 2 or more, more preferably 6 or more, further preferably 9 or more, and still further preferably 10 or more, and is preferably 26 or less, more preferably 20 or less, and further preferably 16 or less.

Examples of the aliphatic dicarboxylic acid include oxalic acid, malonic acid, maleic acid, fumaric acid, sebacic acid, citraconic acid, itaconic acid, glutaconic acid, succinic acid, adipic acid, and a succinic acid substituted with an alkyl group having 1 or more and 20 or less carbon atoms or an alkenyl group having 2 or more and 20 or less carbon atoms, such as dodecenylsuccinic acid and octylsuccinic acid. Among these, a succinic acid substituted with an alkyl group having 1 or more and 20 or less carbon atoms or an alkenyl group having 2 or more and 20 or less carbon atoms is preferred, dodecenylsuccinic acid and octylsuccinic acid are more preferred, and dodecenylsuccinic acid is further preferred. These compounds may be used alone or as a combination of two or more kinds thereof.

The content of the aliphatic dicarboxylic acid is preferably 5% by mol or more, more preferably 10% by mol or more, and further preferably 15% by mol or more, may be 100% by mol or less, and is preferably 80% by mol or less, more preferably 60% by mol or less, and further preferably 40% by mol or less, in the carboxylic acid component.

The carboxylic acid component preferably contains a tribasic or higher carboxylic acid.

The tribasic or higher carboxylic acid is preferably a tribasic carboxylic acid, and more preferably trimellitic acid.

The content of the tribasic or higher carboxylic acid is preferably 3% by mol or more, more preferably 5% by mol or more, and further preferably 8% by mol or more, and is preferably 30% by mol or less, more preferably 25% by mol or less, and further preferably 20% by mol or less, in the carboxylic acid component.

The alcohol component may appropriately contain a monohydric alcohol, and the carboxylic acid component may appropriately contain a monobasic carboxylic acid, from the standpoint of the molecular weight control.

The equivalent ratio of the carboxylic acid component and the alcohol component (COOH group/OH group) is preferably 0.6 or more, and more preferably 0.7 or more, and is preferably 1.3 or less, and more preferably 1.2 or less, from the standpoint of the control of the end groups.

The polycondensation of the alcohol component and the carboxylic acid component may be performed, for example, in an inert gas atmosphere, in the presence of an esterification catalyst, an esterification promoter, a polymerization inhibitor, and the like depending on necessity, at a temperature approximately of 180° C. or more and 250° C. or less. Examples of the esterification catalyst include a tin compound, such as dibutyl tin oxide and tin(II) 2-ethylhexanoate, and a titanium compound, such as titanium diisopropylate bistriethanolaminate. Examples of the esterification promoter include gallic acid. Examples of the polymerization inhibitor include tert-butyl catechol. The amount of the esterification catalyst used is preferably 0.01 part by mass or more, and more preferably 0.1 part by mass or more, and is preferably 2 parts by mass or less, and more preferably 1 part by mass or less, per 100 parts by mass in total of the alcohol component and the carboxylic acid component. The amount of the esterification promoter used is preferably 0.001 part by mass or more, and more preferably 0.01 part by mass or more, and is preferably 0.5 part by mass or less, and more preferably 0.1 part by mass or less, per 100 parts by mass in total of the alcohol component and the carboxylic acid component. The amount of the polymerization inhibitor used is preferably 0.001 part by mass or more, and more preferably 0.01 part by mass or more, and is preferably 0.5 part by mass or less, and more preferably 0.1 part by mass or less, per 100 parts by mass in total of the alcohol component and the carboxylic acid component.

[Amorphous Composite Resin]

The amorphous composite resin has a polyester resin segment and an addition polymer resin segment.

(Polyester Resin Segment)

The polyester resin segment is formed of a polyester resin, and preferred examples of the polyester resin include the same ones as those exemplified for the amorphous polyester resin described above.

(Addition Polymer Resin Segment)

The addition polymer resin segment is preferably an addition polymer of a raw material monomer containing a styrene based compound.

Examples of the styrene based compound include styrene and a styrene derivative, such as α-methylstyrene and vinyltoluene (hereinafter styrene and a styrene derivative are inclusively referred simply to as a "styrene based compound").

The content of the styrene based compound is preferably 50% by mass or more, more preferably 60% by mass or more, further preferably 70% by mass or more, and still further preferably 75% by mass or more, may be 100% by mass or less, and is preferably 95% by mass or less, and more preferably 90% by mass or less, in the raw material monomer of the addition polymer resin.

Examples of the raw material monomer of the addition polymer resin used in addition to the styrene based compound include an alkyl(meth)acrylate ester; an ethylenic unsaturated monoolefin compound, such as ethylene and propylene; a diolefin compound, such as butadiene; a halovinyl compound, such as vinyl chloride; a vinyl ester compound, such as vinyl acetate and vinyl propionate; a vinyl ether compound, such as vinyl methyl ether; a vinylidene halide, such as vinylidene chloride; and an N-vinyl compound, such as N-vinylpyrrolidone.

Two or more kinds of the raw material monomers of the addition polymer resin used in addition to the styrene based compound may be used.

In the raw material monomer of the addition polymer resin used in addition to the styrene based compound, an alkyl(meth)acrylate ester is preferred from the standpoint of the facilitation of the control of the resin characteristics. The number of carbon atoms of the alkyl group in the alkyl (meth)acrylate ester is preferably 1 or more, more preferably 3 or more, and further preferably 6 or more, and is preferably 22 or less, more preferably 18 or less, further preferably 12 or less, and still further preferably 10 or less. The number of carbon atoms of the alkyl ester means the number of carbon atoms derived from the alcohol component constituting the ester.

Examples of the alkyl(meth)acrylate ester include methyl (meth)acrylate, ethyl(meth)acrylate, (iso)propyl(meth)acrylate, 2-hydroxyethyl(meth)acrylate, (iso- or tert-)butyl (meth)acrylate, 2-ethylhexyl(meth)acrylate, (iso)octyl (meth)acrylate, (iso)decyl(meth)acrylate, and (iso)stearyl (meth)acrylate. The terms "(iso- or tert-)" and "(iso)" mean both cases where the prefix exists and does not exist, and the case where the prefix does not exist means a normal compound.

The content of the alkyl(meth)acrylate ester is preferably 5% by mass or more, more preferably 10% by mass or more, and further preferably 12% by mass or more, and is preferably 50% by mass or less, more preferably 40% by mass or less, and further preferably 30% by mass or less, in the raw material monomer of the addition polymer resin segment, from the standpoint of the control of the resin characteristics.

The addition polymerization reaction of the raw material monomer of the addition polymer resin may be performed, for example, by an ordinary method in the presence of a polymerization initiator, such as dicumyl peroxide, a crosslinking agent, and the like, in the presence of an organic solvent or the absence of solvent. The temperature condition is preferably 110° C. or more, more preferably 120° C. or more, and further preferably 130° C. or more, and is preferably 250° C. or less, more preferably 200° C. or less, and further preferably 170° C. or less.

In the case where an organic solvent is used in the addition polymerization reaction, xylene, toluene, methyl ethyl ketone, acetone, and the like may be used. The amount of the organic solvent used is preferably 10 parts by mass or more and 50 parts by mass or less per 100 parts by mass of the raw material monomer of the addition polymer resin.

(Bireactive Monomer)

The composite resin preferably has a unit derived from a bireactive monomer that connects the polyester resin segment and the addition polymer resin segment. For example, the composite resin can be obtained by performing polycondensation reaction or addition polymerization reaction for polymerizing the raw material monomer of the polyester resin segment and the raw material monomer of the addition polymer resin segment, in the presence of the bireactive monomer.

The composite resin is preferably a resin that is obtained by polymerizing the bireactive monomer that is capable of being reacted with (i) the raw material monomer of the polyester resin segment containing an alcohol component and a carboxylic acid component, (ii) the raw material monomer of the addition polymer resin segment, or (iii) both the raw material monomer of the polyester resin segment and the raw material monomer of the addition polymer resin segment.

The bireactive monomer is preferably a compound that has in the molecule at least one kind of a functional group selected from the group consisting of a hydroxy group, a carboxy group, an epoxy group, a primary amino group, and a secondary amino group, preferably at least one kind of a functional group selected from the group consisting of a hydroxy group and a carboxy group, and more preferably a carboxy group, and an ethylenic unsaturated bond.

Examples of the bireactive monomer include acrylic acid, methacrylic acid, fumaric acid, maleic acid, and maleic anhydride. Among these, acrylic acid, methacrylic acid, and fumaric acid are preferred, and acrylic acid and methacrylic acid are more preferred, from the standpoint of the reactivity in the polycondensation reaction and the addition polymerization reaction. However, in the case where a polymerization inhibitor is used in combination, a polybasic carboxylic acid having an ethylenic unsaturated bond, such as fumaric acid, functions as the raw material monomer of the polyester resin segment. In this case, fumaric acid or the like is not the bireactive monomer but is the raw material monomer of the polyester resin segment.

The amount of the bireactive monomer used is preferably 1 part by mol or more, more preferably 2 parts by mol or more, and further preferably 3 parts by mol or more, and is preferably 20 parts by mol or less, more preferably 10 parts by mol or less, and further preferably 7 parts by mol or less, per 100 parts by mol in total of the alcohol component of the polyester resin segment, from the standpoint of the control of the resin characteristics.

The mass ratio of the polyester resin segment and the addition polymer resin segment (polyester resin segment/ addition polymer resin segment) in the composite resin is preferably 60/40 or more, more preferably 70/30 or more, and further preferably 75/25 or more, from the standpoint of the enhancement of the low-temperature fusing property, and is preferably 95/5 or less, more preferably 90/10 or less, and further preferably 85/15 or less, from the standpoint of the enhancement of the heat resistant storage stability. In the aforementioned calculation, the mass of the polyester resin segment is an amount that is obtained by subtracting the amount of reaction water (calculated value) dehydrated through the polycondensation reaction, from the mass of the raw material monomer of the polyester resin used, and the amount of the bireactive monomer is included in the amount of the raw material monomer of the polyester resin segment. The amount of the addition polymer resin segment is the amount of the raw material monomer of the addition polymer resin segment, and the amount of the polymerization initiator is included in the amount of the raw material monomer of the addition polymer resin segment.

[Properties of Resin A]

The softening point of the resin A is preferably 75° C. or more, more preferably 80° C. or more, and further preferably 85° C. or more, from the standpoint of the enhancement of the heat resistant storage stability, and is preferably 150° C.

or less, more preferably 145° C. or less, and further preferably 140° C. or less, from the standpoint of the enhancement of the low-temperature fusing property.

The glass transition temperature of the resin A is preferably 45° C. or more, more preferably 50° C. or more, and further preferably 55° C. or more, from the standpoint of the enhancement of the heat resistant storage stability, and is preferably 80° C. or less, more preferably 75° C. or less, further preferably 70° C. or less, and still further preferably 65° C. or less, from the standpoint of the enhancement of the low-temperature fusing property.

The acid value of the resin A is preferably 1 mgKOH/g or more, more preferably 3 mgKOH/g or more, and further preferably 5 mgKOH/g or more, and is preferably 40 mgKOH/g or less, more preferably 30 mgKOH/g or less, and further preferably 20 mgKOH/g or less.

The content of the resin A in the toner is preferably 40% by mass or more, more preferably 50% by mass or more, further preferably 60% by mass or more, still further preferably 70% by mass or more, still more further preferably 80% by mass or more, still more further preferably 90% by mass or more, may be less than 100% by mass, and is preferably 99% by mass or less, more preferably 98% by mass or less, and further preferably 97% by mass or less, based on the total amount of the binder resin as 100% by mass, from the standpoint of the enhancement of the low-temperature fusing property. The total amount of the binder resin means the total amount of the resin components, such as the resin A and the resin C, contained in the toner.

<Crystalline Resin C>

The binder resin contains the crystalline resin C from the standpoint of the enhancement of the low-temperature fusing property.

Examples of the resin C include a crystalline polyester based resin, such as a crystalline polyester resin and a crystalline composite resin having a polyester resin segment and an addition polymer resin segment. Among these, at least one kind selected from a crystalline polyester resin and a crystalline composite resin having a polyester resin segment and an addition polymer resin segment is preferred, and a crystalline composite resin having a polyester resin segment and an addition polymer resin segment is more preferred, from the standpoint of the suppression of occurrence of fogging.

In the following description, as a preferred embodiment of the resin C, the descriptions of the items that are common to the examples for the resin A are omitted, and only preferred embodiments of the resin C are described.

[Crystalline Polyester Resin]
(Alcohol Component)

The alcohol component is preferably an aliphatic polyol compound from the standpoint of the enhancement of the low-temperature fusing property.

Examples of the aliphatic polyol compound include an aliphatic diol having 2 or more and 20 or less carbon atoms and a trihydric or higher aliphatic alcohol, such as glycerin. Among these, an aliphatic diol is preferred, and an α,α-aliphatic diol is more preferred.

The number of carbon atoms of the aliphatic diol is preferably 2 or more, more preferably 4 or more, further preferably 6 or more, still further preferably 9 or more, and still more further preferably 11 or more, and is preferably 20 or less, more preferably 16 or less, and further preferably 14 or less, from the standpoint of the enhancement of the low-temperature fusing property.

Examples of the α,ω-aliphatic diol include ethylene glycol, 1,3-propanediol, 1,4-butanediol, 1,5-pentanediol, 1,6-hexanediol, 1,10-decanediol, and 1,12-dodecanediol. Among these, 1,4-butanediol, 1,6-hexanediol, 1,10-decanediol, and 1,12-dodecanediol are preferred, and 1,12-dodecanediol is more preferred.

The content of the am-aliphatic diol in the alcohol component is preferably 70% by mol or more, more preferably 90% by mol or more, further preferably 95% by mol or more, and still further preferably 100% by mol.

(Carboxylic Acid Component)

The carboxylic acid component is preferably an aliphatic dicarboxylic acid from the standpoint of the enhancement of the low-temperature fusing property.

The number of carbon atoms of the aliphatic dicarboxylic acid is preferably 4 or more, more preferably 6 or more, further preferably 9 or more, and still further preferably 10 or more, and is preferably 22 or less, more preferably 20 or less, further preferably 16 or less, and still further preferably 14 or less, from the standpoint of the enhancement of the low-temperature fusing property.

The aliphatic dicarboxylic acid is preferably sebacic acid or fumaric acid, and more preferably sebacic acid.

The content of the aliphatic dicarboxylic acid is preferably 50% by mol or more, more preferably 65% by mol or more, and further preferably 80% by mol or more, and may be 100% by mol or less, in the carboxylic acid component.

[Crystalline Composite Resin]

The crystalline composite resin has a polyester resin segment and an addition polymer resin segment. The polyester resin segment is formed of a polyester resin, and preferred examples of the polyester resin include the same ones as those exemplified for the crystalline polyester resin described above. The constitution thereof other than the polyester resin segment is the same as in the amorphous composite resin, the preferred ranges of which are also the same, and therefore the descriptions thereof are omitted herein.

The resin C preferably contains an aliphatic diol having 9 or more and 14 or less carbon atoms as an alcohol component and an aliphatic dicarboxylic acid compound having 9 or more and 14 or less carbon atoms as a carboxylic acid component from the standpoint of the enhancement of the low-temperature fusing property.

[Properties of Resin C]

The melting point of the resin C is preferably 65° C. or more, more preferably 70° C. or more, further preferably 75° C. or more, and still further preferably 80° C. or more, from the standpoint of the achievement of the toner excellent in the low-temperature fusing property and the black solid image uniformity, and is preferably 150° C. or less, more preferably 135° C. or less, and further preferably 120° C. or less, from the standpoint of the enhancement of the low-temperature fusing property.

The softening point of the resin C is preferably 75° C. or more, more preferably 80° C. or more, and further preferably 85° C. or more, from the standpoint of the achievement of the toner excellent in the low-temperature fusing property and the black solid image uniformity, and is preferably 150° C. or less, more preferably 135° C. or less, and further preferably 120° C. or less, from the standpoint of the enhancement of the low-temperature fusing property.

The content of the resin C in the toner is preferably 1% by mass or more, more preferably 2% by mass or more, and further preferably 3% by mass or more, and is preferably 30% by mass or less, more preferably 25% by mass or less, further preferably 20% by mass or less, still further preferably 15% by mass or less, and still more further preferably 10% by mass or less, based on the total amount of the binder resin as 100% by mass, from the standpoint of the enhancement of the low-temperature fusing property.

<Release Agent>

The release agent used in the present invention contains ester wax (W) containing a dipentaerythritol unit as a constitutional component from the standpoint of the achievement of the toner excellent in the low-temperature fusing property and the black solid image uniformity.

[Ester Wax (W)]

The ester wax (W) contains a dipentaerythritol unit as a constitutional component from the standpoint of the achievement of the toner excellent in the low-temperature fusing property and the black solid image uniformity.

The ester wax (W) is preferably an ester condensate of dipentaerythritol and an aliphatic monocarboxylic acid.

In the ester wax (W), the ester substitution number of dipentaerythritol by the aliphatic monocarboxylic acid is preferably 4 or more, and more preferably 5 or more, and is preferably 6 or less, and more preferably 6, from the standpoint of the achievement of the toner excellent in the low-temperature fusing property and the black solid image uniformity.

The number of carbon atoms of the aliphatic monocarboxylic acid is preferably 8 or more, more preferably 10 or more, further preferably 12 or more, and still further preferably 14 or more, and is preferably 30 or less, more preferably 26 or less, further preferably 24 or less, and still further preferably 20 or less. The aliphatic monocarboxylic acid may be either a linear aliphatic monocarboxylic acid or a branched aliphatic monocarboxylic acid, and is preferably a linear aliphatic monocarboxylic acid. Accordingly, the aliphatic monocarboxylic acid is preferably a linear aliphatic monocarboxylic acid having 8 or more and 30 or less carbon atoms.

Specific examples of the aliphatic monocarboxylic acid include octanoic acid, decanoic acid, lauric acid, myristic acid, palmitic acid, stearic acid, oleic acid, icosanoic acid, and tetracosanoic acid. These compounds may be one kind or two or more kinds. Among these, at least one kind selected from the group consisting of lauric acid, myristic acid, palmitic acid, and stearic acid is preferred, at least one kind selected from the group consisting of myristic acid, palmitic acid, and stearic acid is more preferred, at least one kind selected from the group consisting of palmitic acid and stearic acid is further preferred, and stearic acid is still further preferred.

The ester wax (W) is not particularly limited in the production method thereof, and may be obtained, for example, by condensing dipentaerythritol and the aliphatic monocarboxylic acid in an inert gas atmosphere at a temperature of 160° C. or more and 270° C. or less.

The melting point of the ester wax (W) is preferably 60° C. or more, more preferably 65° C. or more, and further preferably 70° C. or more, from the standpoint of the achievement of the toner excellent in the low-temperature fusing property and the black solid image uniformity, and is preferably 150° C. or less, more preferably 135° C. or less, further preferably 120° C. or less, and still further preferably 100° C. or less, from the same standpoint.

The content of the ester wax (W) in the release agent is preferably 40% by mass or more, more preferably 60% by mass or more, further preferably 80% by mass or more, still further preferably 90% by mass or more, and still more further preferably 95% by mass or more, may be 100% by mass or less, and further preferably 100% by mass, based on the release agent as 100% by mass, from the standpoint of the achievement of the toner excellent in the low-temperature fusing property and the black solid image uniformity.

[Other Release Agent]

The toner may contain the other release agent than the ester wax (W) (i.e., a release agent other than the ester wax (W)) in such a range that does not impair the effects of the present invention.

Examples of the other release agent include polypropylene wax, polyethylene wax, and polypropylene-polyethylene copolymer wax; hydrocarbon based wax and an oxide thereof, such as microcrystalline wax, paraffin wax, Fischer-Tropsch wax, and Sasol wax; carnauba wax, montan wax, and deoxidized wax thereof, ester based wax, such as fatty acid ester wax, other than the ester wax (W); a fatty acid amide compound, a fatty acid compound, a higher alcohol compound, and a fatty acid metal salt. These compounds may be used alone or as a combination of two or more kinds thereof.

The melting point of the other release agent is preferably 60° C. or more, and more preferably 70° C. or more, from the standpoint of the further enhancement of the low-temperature fusing property and the black solid image uniformity, and is preferably 160° C. or less, more preferably 150° C. or less, and further preferably 140° C. or less, from the standpoint of the further enhancement of the low-temperature fusing property.

The content of the release agent in the toner is preferably 0.1 part by mass or more, more preferably 0.3 part by mass or more, further preferably 0.8 part by mass or more, still further preferably 1 part by mass or more, and still more further preferably 1.5 parts by mass or more, and is preferably 30 parts by mass or less, more preferably 20 parts by mass or less, further preferably 10 parts by mass or less, still further preferably 5 parts by mass or less, and still more further preferably 3 parts by mass or less, per 100 parts by mass in total of the binder resin, from the standpoint of the achievement of the toner excellent in the low-temperature fusing property and the black solid image uniformity. Accordingly, the mass ratio of the release agent to the binder resin (release agent/binder resin) is preferably 0.001 or more, more preferably 0.003 or more, further preferably 0.008 or more, still further preferably 0.01 or more, and still more further preferably 0.015 or more, and is preferably 0.3 or less, more preferably 0.2 or less, further preferably 0.1 or less, still further preferably 0.05 or less, and still more further preferably 0.03 or less.

The content of the ester wax (W) in the toner is preferably 0.3 part by mass or more, more preferably 0.8 part by mass or more, further preferably 1 part by mass or more, and still further preferably 1.5 parts by mass or more, and is preferably 30 parts by mass or less, more preferably 20 parts by mass or less, further preferably 10 parts by mass or less, still further preferably 5 parts by mass or less, and still more further preferably 3 parts by mass or less, per 100 parts by mass in total of the binder resin, from the standpoint of the achievement of the toner excellent in the low-temperature fusing property and the black solid image uniformity.

The content of the other release agent in the toner is preferably 0.1 part by mass or more, more preferably 0.5 part by mass or more, and further preferably 1 part by mass or more, and is preferably 5 parts by mass or less, more preferably 3 parts by mass or less, and further preferably 2 parts by mass or less, per 100 parts by mass in total of the binder resin, from the standpoint of the further enhancement of the low-temperature fusing property.

<Charge Controlling Resin>

The toner of the present invention may further contain a charge controlling resin.

Examples of the charge controlling resin include a styrene-acrylic resin, a polyamine resin, and a phenol resin. Among these, a styrene-acrylic resin is preferred, and a quaternary ammonium salt group-containing styrene-acrylic based copolymer is more preferred, from the standpoint of the decrease of the pulverization pressure in pulverizing for suppressing the generation of fine powder and for enhancing the pulverization and classification yield.

Examples of the quaternary ammonium salt group-containing styrene-acrylic based copolymer include "FCA-201PS" (manufactured by Fujikura Kasei Co., Ltd.).

Examples of the other styrene-acrylic resin include "FCA-1001NS" (manufactured by Fujikura Kasei Co., Ltd.), which is a styrene-acrylic based copolymer containing no quaternary ammonium salt group. Examples of the polyamine resin include "AFP-B" (manufactured by Orient Chemical Industries, Co., Ltd.), and examples of the phenol resin include "FCA-2521NJ" and "FCA-2508N" (all manufactured by Fujikura Kasei Co., Ltd.).

The content of the charge controlling resin in the toner is preferably 3 parts by mass or more, more preferably 4 parts by mass or more, and further preferably 5 parts by mass or more, and is preferably 30 parts by mass or less, more preferably 20 parts by mass or less, and further preferably 15 parts by mass or less, per 100 parts by mass of the binder resin.

<Charge Controlling Agent>

The toner of the present invention may further contain a charge controlling agent.

The charge controlling agent is not particularly limited, and both a positively charged charge controlling agent and a negatively charged charge controlling agent may be used.

Examples of the positively charged charge controlling agent include a nigrosine dye, such as "Nigrosine Base EX", "Oil Black BS", "Oil Black SO", "Bontron N-01", "Bontron N-04", "Bontron N-07", "Bontron N-09", and "Bontron N-11" (all manufactured by Orient Chemical Industries, Co., Ltd.); a triphenylmethane based dye having a tertiary amine as a side chain, and a quaternary ammonium compound, such as "Bontron P-51" (manufactured by Orient Chemical Industries, Co., Ltd.), cetyltrimethylammonium bromide, and "Copy Charge PX VP435" (manufactured by Clariant Japan Co., Ltd.); a polyamine resin, such as "AFP-B" (manufactured by Orient Chemical Industries, Co., Ltd.); an imidazole derivative, such as "PLZ-2001" and "PLZ-8001" (all manufactured by Shikoku Chemicals Corporation); and a styrene-acrylic based resin, such as "FCA-701PT" (manufactured by Fujikura Kasei Co., Ltd.).

Examples of the negatively charged charge controlling agent include a metal-containing azo dye, such as "Valifast Black 3804", "Bontron S-31", "Bontron S-32", "Bontron S-34", and "Bontron S-36" (all manufactured by Orient Chemical Industries, Co., Ltd.), and "Aizen Spilon Black TRH" and "T-77" (all manufactured by Hodogaya Chemical Co., Ltd.); a metal compound of a benzylic acid compound, such as "LR-147" and "LR-297" (all manufactured by Japan Carlit Co., Ltd.); a metal compound of a salicylic acid compound, such as "Bontron E-81", "Bontron E-84", "Bontron E-88, and "Bontron E-304" (all manufactured by Orient Chemical Industries, Co., Ltd.), and "TN-105" (manufactured by Hodogaya Chemical Co., Ltd.); a copper phthalocyanine dye; a quaternary ammonium salt, such as "Copy Charge NX VP434" (manufactured by Clariant Japan Co., Ltd.) and a nitroimidazole derivative; and an organic metal compound.

The content of the charge controlling agent in the toner is preferably 0.01 part by mass or more, and more preferably 0.2 part by mass or more, and is preferably 10 parts by mass or less, more preferably 5 parts by mass or less, and further preferably 3 parts by mass or less, per 100 parts by mass of the binder resin.

<Colorant>

The toner of the present invention may further contain a colorant.

The colorant used may be any of dyes, pigments, and the like having been used as a colorant for a toner, examples of which include carbon black, phthalocyanine blue, permanent brown FG, brilliant fast scarlet, pigment green B, rhodamine-B base, solvent red 49, solvent red 146, solvent blue 35, quinacridone, carmine 6B, and disazo yellow, and the toner obtained by the method of the present invention may be any of a black toner and a color toner.

The content of the colorant in the toner is preferably 1 part by mass or more, and more preferably 2 parts by mass or more, and is preferably 40 parts by mass or less, more preferably 20 parts by mass or less, and further preferably 10 parts by mass or less, per 100 parts by mass of the binder resin, from the standpoint of the enhancement of the image density of the toner.

In the present invention, additives, such as magnetic powder, a fluidity enhancer, a conductivity controlling agent, a reinforcing filler, such as a fibrous substance, an antioxidant, an anti-aging agent, and a cleaning property enhancer, may be appropriately used as a toner material.

<External Additive>

The toner of the present invention is a toner having matrix particles coated with inorganic fine particles.

The external additive used in the present invention is inorganic fine particles, and the inorganic fine particles contain positively charged silica (S1) and negatively charged silica (S2) having particular average particle diameters. The toner of the present invention contains both the positively charged silica and the negatively charged silica, and thereby is excellent in the low-temperature fusing property and the black solid image uniformity. The charging property of silica can be measured with a blow-off charge amount measurement apparatus.

(Positively Charged Silica (S1))

The positively charged silica (S1) is not particularly limited in kind thereof and is preferably hydrophobic silica. Silica has anionic property and thus is basically negatively charged. Accordingly, the positively charged silica (S1) is preferably subjected to a surface treatment with a hydrophobic treatment agent for imparting positive charging capability to the silica, and is more preferably subjected to a surface treatment with a hydrophobic treatment agent having a nitrogen atom in the side chain thereof.

The positively charged silica (S1) has an average particle diameter that is smaller than the average particle diameter of the negatively charged silica (S2) from the standpoint of the achievement of the toner excellent in the low-temperature fusing property and the black solid image uniformity. The average particle diameter of the positively charged silica (S1) is preferably 3 nm or more, and more preferably 5 nm or more, and is preferably 40 nm or less, more preferably 30 nm or less, and further preferably 20 nm or less.

Examples of the positively charged silica (S1) include "TG-820F" and "TG-7120" (all manufactured by Cabot Specialty Chemicals, Inc.), "NA 50Y" (manufactured by Nippon Aerosil Co., Ltd.), and "MSP-012" (manufactured by Tayca Corporation).

Examples of the hydrophobic treatment agent for the surface treatment of the silica, for example, the hydrophobic treatment agent for imparting positive charging capability to the silica, include an aminosilane, and an organopolysiloxane having a nitrogen atom in the side chain.

The organopolysiloxane having a nitrogen atom in the side chain can be obtained, for example, by replacing one or more kind of the side chain of an organopolysiloxane by a group having an amino group. Examples of the group having an amino group include $-R^1-NH-R^2-N(R^3)_2$, $-R^1-N(R^3)_2$ (wherein $R^1$ and $R^2$ each represent an alkylene group (preferably an alkylene group having 1 or more and 10 or less carbon atoms, and more preferably 1 or more and 5 or less carbon atoms) or an arylene group (preferably an arylene group having 6 or more and 18 or less carbon atoms, and more preferably a phenylene group), and $R^3$ represents a hydrogen atom or an alkyl group having 1 or more and 4 or less carbon atoms, and preferably a hydrogen atom).
(Negatively Charged Silica (S2))

The negatively charged silica (S2) is silica particles having negative charging capability, which is not particularly limited in kind thereof and is preferably hydrophobic silica. The negatively charged silica (S2) is preferably subjected to a surface treatment with a hydrophobic treatment agent.

The negatively charged silica (S2) has an average particle diameter of 10 nm or more, preferably 15 nm or more, and more preferably 30 nm or more, and is 90 nm or less, preferably 70 nm or less, and more preferably 50 nm or less, from the standpoint of the achievement of the toner excellent in the low-temperature fusing property and the black solid image uniformity.

Examples of the negatively charged silica (S2) include "RY 50", "NAX 50", and "R 972" (all manufactured by Nippon Aerosil Co., Ltd.).

Examples of the hydrophobic treatment agent for imparting negative charging capability to the silica include a silicone oil, dimethyldichlorosilane, hexamethyldisilazane, and methyltriethoxysilane, and among these, a silicone oil and hexamethyldisilazane are preferred.

The method for the surface treatment with the hydrophobic treatment agent is not particularly limited, as far as the hydrophobic treatment agent is adsorbed to the surface of the silica fine particles by the method, and examples thereof include a method of spraying a solution of the hydrophobic treatment agent diluted with a solvent onto the silica agitated in a mixing tank, and heating and drying the silica for a predetermined period of time under continuous agitation. The amount of the hydrophobic treatment agent applied is preferably 1 $mg/m^2$ or more and 7 $mg/m^2$ or less based on the surface area of the silica fine particles.

The average particle diameters of the positively charged silica (S1) and the negatively charged silica (S2) each mean the number average particle diameter, which is obtained in such a manner that 500 particles on a micrograph of a scanning electron microscope (SEM) are measured for the particle diameter (i.e., the average value of the major diameter and the minor diameter), and the number average value of the measured values is designated as the average particle diameter.

An external additive other than the positively charged silica (S1) and the negatively charged silica (S2) may be used in such a range that does not impair the effects of the present invention. Examples of the external additive include inorganic fine particles, such as titanium oxide fine particles, alumina fine particles, cerium oxide fine particles, and carbon black; and polymer fine particles, such as polycarbonate, polymethyl methacrylate, and a silicone resin.

The amount of the external additive added is preferably 0.1 part by mass or more, more preferably 0.5 part by mass or more, and further preferably 1 part by mass or more, and is preferably 5 parts by mass or less, and more preferably 4 parts by mass or less, per 100 parts by mass of the toner particles.

The mass ratio of the negatively charged silica (S2) to the total mass of the positively charged silica (S1) and the negatively charged silica (S2) (negatively charged silica (S2)/(positively charges silica (S1)+negatively charged silica (S2)) is preferably 0.1 or more, and more preferably 0.2 or more, and is preferably 0.5 or less, and more preferably 0.4 or less, from the standpoint of the achievement of the toner excellent in the low-temperature fusing property and the black solid image uniformity.
<Production Method of Toner>

Examples of the production method of the toner include (1) a method of melt-kneading a mixture including the binder resin, and pulverizing the resulting melt-kneaded product to produce the toner (which may be hereinafter referred to as a "melt-kneading method"), (2) a method of aggregating and fusing binder resin fine particles in a mixture including a dispersion liquid having the binder resin dispersed in a water soluble medium, so as to provide toner particles (which may be hereinafter referred to as an "aggregation and fusion method"), (3) a method of performing high-speed agitation of a dispersion liquid having the binder resin dispersed in a water soluble medium with the materials of the toner, so as to produce the toner. While the method for producing the toner of the present invention may be any of the methods, the melt-kneading method is preferred from the standpoint of the enhancement of the productivity of the toner and the standpoint of the enhancement of the fusing property of the toner, and the toner may also be obtained by the aggregation and fusion method. Accordingly, the toner is preferably a pulverized toner by the melt-kneading method.

It is preferred that the toner materials including the binder resin, the release agent, and depending on necessity the colorant, the charge controlling resin, the charge controlling agent, and the like are mixed in advance with a mixer, such as a Henschel mixer and a ball mill, and then fed to a kneader.

The melt-kneading of the mixture including the binder resin, the release agent, and depending on necessity the colorant, the charge controlling resin, the charge controlling agent, and the like is preferably melt-kneading with a melt-kneader. The melt-kneading time depends on the scale of the kneader used, which is preferably 1 hour or less, more preferably 30 minutes or less, further preferably 10 minutes or less, and still further preferably 5 minutes or less, and is, for example, 1 minute or more.

The melt-kneading may be performed by using a known kneader, such as a closed kneader, a single screw extruder, a twin screw extruder, and an open roll kneader. From the standpoint of the melt-kneading of crystals, a twin screw extruder capable of being set to a high temperature is preferred. The twin screw extruder is preferably such a type that the screws thereof can co-rotate in the same direction. Preferred examples of the commercially available twin screw extruder include Twin Screw Extruder PCM Series (manufactured by Ikegai Corporation) having two screws that can favorably engage with each other at a high speed, from the standpoint of the enhancement of the productivity.

The twin screw extruder has a closed kneading part, and can melt the materials with kneading heat generated in kneading.

The set temperature of the twin screw extruder is not affected by the melting characteristics of the material due to the structure of the extruder, and the melt-kneading can be performed at the intended temperature. The set temperature (i.e., the barrel set temperature) of the twin extruder is preferably the melting point of the ester wax (W) or higher. The melt-kneading at a temperature of the melting point of the ester wax (W) or higher may enable fine and uniform dispersion of the release agent in the matrix of the binder resin. For example, the temperature is preferably 65° C. or more, more preferably 80° C. or more, and further preferably 90° C. or more, and is preferably 160° C. or less, and more preferably 140° C. or less, from the standpoint of the enhancement of the dispersibility of the release agent, the colorant, the charge controlling resin, the charge controlling agent, and the like in the binder resin, the standpoint of the decrease of the mechanical force in melt-kneading for suppressing heat generation, and the standpoint of the enhancement of the productivity of the toner.

The rotational peripheral speed of the co-rotation twin screw extruder is preferably 5 m/min or more, more preferably 10 m/min or more, and further preferably 15 m/min or more, and is preferably 50 m/min or less, more preferably 40 m/min or less, and further preferably 30 m/min or less, from the standpoint of the enhancement of the dispersibility of the release agent, the colorant, the charge controlling resin, the charge controlling agent, and the like in the binder resin, and the standpoint of the decrease of the mechanical force in melt-kneading for suppressing heat generation.

The production method of the toner of the present invention preferably further includes steps of pulverizing and classifying the resulting melt-kneaded product.

The pulverizing step may be performed in multiple stages divided. For example, the resin kneaded product may be coarsely pulverized to approximately from 1 to 5 mm, and then further finely pulverized to the target particle diameter.

The pulverizer used in the pulverizing step is not particularly limited, and examples of the pulverizer that is favorably used in the coarse pulverization include a hammer mill, an atomizer, and Rotoplex. Examples of the pulverizer that is favorably used in the fine pulverization include a fluidized bed jet mill, a collision plate jet mill, and a rotation mechanical mill. A fluidized bed jet mill or a collision plate jet mill is preferably used, and a collision plate jet mill is more preferably used, from the standpoint of the pulverization efficiency.

Examples of the classifier used in the classifying step include an airflow classifier, an inertia classifier, and a sieve classifier. The pulverized product that is removed in the classifying step due to the insufficient pulverization thereof may be again subjected to the pulverizing step, and the pulverizing step and the classifying step may be repeated depending on necessity.

The volume median particle diameter $D_{50}$ of the powder obtained through the pulverization and classification (i.e., the toner matrix particles) is preferably 2 μm or more, more preferably 3 μm or more, and further preferably 4 μm or more, and is preferably 20 μm or less, more preferably 15 μm or less, and further preferably 10 μm or less.

The production method of the toner of the present invention may include, after the pulverizing and classifying steps, a step of mixing the toner particles obtained through the pulverization and classification (i.e., the toner matrix particles) with an external additive, and the aforementioned inorganic fine particles are used as the external additive.

The mixing of the toner particles and the external additive is preferably performed by using a mixer equipped with an agitator, such as rotary blades, preferably using a high-speed mixer, such as a Henschel mixer and a super mixer, and more preferably using a Henschel mixer.

The toner may be used for the development of a latent image formed by an electrophotographic method, an electrostatic recording method, an electrostatic printing method, and the like. The toner can be applied to an image forming apparatus of a one-component developing system or a two-component developing system as a one-component developing toner or a two-component developing toner used after mixing with a carrier, respectively.

The positively charged toner for development of an electrostatic image of the present invention is excellent in simultaneous achievement of the low-temperature fusing property and the black solid image uniformity.

EXAMPLES

The property values of the resins and the like were measured and evaluated in the following manners.
[Measurement Methods of Properties]
[Softening Point of Resin]

By using a flow tester "CFT-500D" (manufactured by Shimadzu Corporation), 1 g of a specimen was heated at a temperature rise rate of 6° C./min and extruded from a nozzle having a diameter of 1 mm and a length of 1 mm by applying a load of 1.96 MPa with a plunger. The descent amount of the plunger of the flow tester was plotted with respect to the temperature, and the temperature at which the half amount of the specimen had flowed out was designated as the softening point.
[Glass Transition Temperature of Resin]

By using a differential scanning calorimeter "Q-20" (manufactured by TA Instruments Japan, Inc.), 0.01 to 0.02 g of a specimen was weighed on an aluminum pan, heated to 200° C., and cooled from that temperature to 0° C. at a temperature fall rate of 10° C./min. The temperature was then increased at a temperature rise rate of 10° C./min and measured.

The intersection point of the extended line of the base line at the endothermic maximum peak temperature or lower and the tangent line showing the maximum gradient from the rising edge of the peak to the apex of the peak was designated as the glass transition temperature.
[Endothermic Maximum Peak Temperature and Melting Point of Resin]

By using a differential scanning calorimeter "Q-100" (manufactured by TA Instruments Japan, Inc.), 0.01 to 0.02 g of a specimen was weighed on an aluminum pan, cooled from room temperature (20° C.) to 0° C. at a temperature fall rate of 10° C./min, and retained at that temperature for 1 minute. Thereafter, the specimen was measured at a temperature rise rate of 50° C./min. The temperature of the peak that appeared on the highest temperature side among the observed endothermic peaks was designated as the endothermic maximum peak temperature of the resin. In the case where the difference between the maximum peak temperature and the softening point was 20° C. or less, that temperature was designated as the melting point.
[Acid Value of Resin]

The acid value of the resin was measured according to the method of JIS K0070. Only the measurement solvent was changed from the mixed solvent of ethanol and ether defined in JIS K0070 to a mixed solvent of acetone and toluene (acetone/toluene=1/1 (by volume)).

[Melting Point of Release Agent (Wax)]

By using a differential scanning calorimeter "Q-20" (manufactured by TA Instruments Japan, Inc.), a specimen was heated to 200° C. at a temperature rise rate of 10° C./min to provide a melting endothermic curve, and the endothermic maximum peak temperature observed from the melting endothermic curve was designated as the melting point of the release agent.

[Number Average Particle Diameter of External Additive]

The average particle diameter of the external additive means the number average particle diameter thereof, which was obtained in such a manner that 500 particles on a micrograph of a scanning electron microscope (SEM) were measured for the particle diameter (i.e., the average value of the major diameter and the minor diameter), and the number average value thereof was designated as the average particle diameter.

[Volume Median Particle Diameter ($D_{50}$) of Toner Particles]

The volume median particle diameter ($D_{50}$) of the toner particles was measured in the following manner.

Measurement apparatus: "Coulter Multisizer II" (manufactured by Beckman Coulter Inc.)

Aperture diameter: 100 μm

Analysis software: "Coulter Multisizer AccuComp ver. 1.19" (manufactured by Beckman Coulter Inc.)

Electrolytic solution: "Isoton II" (manufactured by Beckman Coulter Inc.)

Dispersion liquid: "Emulgen 109P" (manufactured by Kao Corporation, polyoxyethylene lauryl ether, HLB: 13.6) was dissolved in the aforementioned electrolytic solution to make a concentration of 5% by mass.

Dispersion condition: 10 mg of a measurement specimen was added to 5 mL of the aforementioned dispersion liquid and dispersed with an ultrasonic dispersing device for 1 minute, to which 25 mL of the dispersion liquid was then added, and further dispersed with an ultrasonic dispersing device for 1 minute, so as to prepare a specimen dispersion liquid.

Measurement condition: The specimen dispersion liquid was added to the 100 mL of the electrolytic solution to make a concentration that enabled the measurement of the particle diameters of 30,000 particles within 20 seconds, and the 30,000 particles were measured to provide a particle size distribution thereof, from which the volume median particle diameter ($D_{50}$) was obtained.

PRODUCTION EXAMPLES OF AMORPHOUS COMPOSITE RESINS

Production Examples A1 and A2 (Resins A1 and A2)

The raw material monomers of the polycondensation resin except for trimellitic anhydride and the esterification catalyst shown in Table 1 were placed in a four-neck flask having a capacity of 10 L equipped with a nitrogen introduction tube, a dehydration tube, an agitator, and a thermocouple, and were subjected to reaction at 230° C. for 12 hours, and to reaction at 8.3 kPa for 1 hour. Thereafter, the temperature was decreased to 160° C., and the raw material monomers of the addition polymer resin, the bireactive monomer, and dicumyl peroxide were added dropwise from a dropping funnel over 1 hour. After aging the addition polymerization reaction by retaining at 160° C. for 1 hour, the temperature was increased to 210° C., and the raw material monomers of the addition polymerization resin were removed at 8.3 kPa for 1 hour. Furthermore, trimellitic anhydride was added at 210° C., and reacted until the target softening point was achieved, so as to provide amorphous composite resins A1 and A2. The properties of the resulting resins are shown in Table 1.

TABLE 1

| Amorphous composite resin | | | A1 | A2 |
|---|---|---|---|---|
| Raw material monomer | Raw material monomer (P) of polycondensation resin | BPA-PO [1] | 3798 g (70) | 3920 g (70) |
| | | BPA-EO [2] | 1511 g (30) | 1560 g (30) |
| | | Terephthalic acid | 1700 g (66) | 1994 g (75) |
| | | Dodecenylsuccinic acid | 415 g (10) | — |
| | | Trimellitic anhydride | 119 g (4) | 154 g (5) |
| | Bireactive monomer (D) | Acrylic acid | 56 g (5) | 58 g (5) |
| | Raw material monomer (A) of addition polymer resin | Styrene | 1480 g (84) | 1514 g (84) |
| | | 2-ethylhexyl acrylate | 282 g (16) | 288 g (16) |
| | Polymerization initiator | Dicumyl peroxide | 106 g (6) | 108 g (6) |
| Total amount of (P) and (D)/total amount of (A) (mass ratio) | | | 81/19 | 81/19 |
| Esterification catalyst | | Tin(II) 2-ethylhexanoate | 38 g | 38 g |
| Properties of resin | Softening point (° C.) | | 136 | 135 |
| | Glass transition temperature (° C.) | | 58 | 63 |
| | Endothermic maximum peak temperature (° C.) | | 62 | 66 |
| | Softening point/Endothermic maximum peak temperature | | 2.2 | 2.1 |
| | Acid value (mgKOH/g) | | 7.6 | 5.6 |

[1] BPA-PO: polyoxypropylene(2.2)-2,2-bis(4-hydroxyphenyl)propane
[2] BPA-EO: polyoxyethylene(2.2)-2,2-bis(4-hydroxyphenyl)propane Note)
The numeral in parentheses shows the molar ratio based on the total molar number of the alcohol component as 100.

PRODUCTION EXAMPLES OF CRYSTALLINE RESINS

Production Examples C1 and C3 (Resins C1 and C3)

The raw material monomers of the polycondensation resin and the esterification catalyst shown in Table 2 were placed in a four-neck flask having a capacity of 10 L equipped with a nitrogen introduction tube, a dehydration tube, an agitator, and a thermocouple, and were heated to 160° C. and subjected to reaction for 6 hours. Thereafter, the raw material monomers of the addition polymer resin, the bireactive monomer, and dicumyl peroxide were added dropwise from a dropping funnel over 1 hour. After aging the addition polymerization reaction by retaining at 160° C. for 1 hour, the raw material monomers of the addition polymerization resin were removed at 8.3 kPa for 1 hour. Furthermore, the temperature was increased to 200° C. over 8 hours, and the reaction was performed at 8.3 kPa for 2 hours, so as to provide crystalline resins C1 and C3. The properties of the resulting resins are shown in Table 2.

Production Example C2 (Resin C2)

The raw material monomers and the esterification catalyst shown in Table 2 were placed in a four-neck flask having a capacity of 10 L equipped with a nitrogen introduction tube, a dehydration tube, an agitator, and a thermocouple, and under a nitrogen atmosphere, the temperature was increased from 130° C. to 200° C. over 10 hours, and the reaction was performed at 200° C. and 8 kPa for 1 hour, so as to provide a crystalline resin C2. The properties of the resulting resin are shown in Table 2.

7.2 mgKOH/g. 500 g of toluene, 330 g of 2-propanol, and 267 g of a 10% by mass potassium hydroxide aqueous solution were added to the product, which were agitated at 70° C. for 1 hour, and allowed to stand for 30 minutes, and then the aqueous layer was removed. The product was rinsed with ion exchanged water until pH reached 7 at 70° C. The solvent was distilled off from the resulting wax-containing solution, and wax W1 was obtained through filtration, solidification, and pulverization.

The same procedures as in Production Example W1 were performed except that the monocarboxylic acid component was changed to the components shown in Table 3, so as to provide wax W2 or W3.

Table 3 shows the melting points of the wax W1 to W3 obtained in Production Examples W1 to W3 and commercially available wax W4 used in the examples.

TABLE 3

| Wax | | Alcohol component | Mono-carboxylic acid component | Note | Melting point (° C.) |
|---|---|---|---|---|---|
| W1 | Kind | dipentaerythritol | stearic acid | — | 78 |
|  | Amount | 254 g (1.0 mol) | 1707 g (6.0 mol) | | |
| W2 | Kind | dipentaerythritol | palmitic acid/ stearic acid = 1/2 (molar ratio) | — | 66 |
|  | Amount | 254 g (1.0 mol) | 531 g (2.0 mol)/ 1138 g (4.0 mol) | | |

TABLE 2

| | Crystalline resin | | C1 | C2 | C3 |
|---|---|---|---|---|---|
| Raw material monomer | Raw material monomer (P) of polycondensation resin | 1,12-Dodecanediol | 4047 g (100) | — | — |
| | | 1,10-Decanediol | — | 4183 g (100) | — |
| | | 1,4-Butanediol | — | — | 756 g (30) |
| | | 1,6-Hexanediol | — | — | 2313 g (70) |
| | | Sebacic acid | 3641 g (90) | 4854 g (100) | — |
| | | Terephthalic acid | — | — | 3347 g (72) |
| | Bireactive monomer (D) | Acrylic acid | 101 g (7) | — | 202 g (10) |
| | Raw material monomer (S) of addition polymer resin | Styrene | 1805 g (100) | — | 2593 g (100) |
| | Polymerization initiator | Dicumyl peroxide | 108 g (6) | — | 156 g (6) |
| | Total amount of (P) and (D)/total amount of (S) (mass ratio) | | 81/19 | 100/0 | 72/28 |
| | Esterification catalyst | Tin(II) 2-ethylhexanoate | 16 g | 18 g | 13 g |
| Properties of crystalline resin | Softening point (° C.) | | 89.3 | 89 | 104 |
| | Endothermic maximum peak temperature (melting point) (° C.) | | 82.4 | 78 | 105 |
| | Softening point/Endothermic maximum peak temperature | | 1.1 | 1.1 | 1.0 |

Note)
The numeral in parentheses shows the molar ratio based on the total molar number of the alcohol component as 100

PRODUCTION EXAMPLES OF WAX

Production Examples W1 to W3 (Wax W1 to W3)

254 g (1.0 mol) of dipentaerythritol as an alcohol component and 1,707 g (6.0 mol) of stearic acid as a monocarboxylic acid component were placed in a four-neck flask having a capacity of 5 L, and were subjected to reaction under a nitrogen atmosphere at 220° C. for 10 hours while removing generated water. The product had an acid value of

TABLE 3-continued

| Wax | | Alcohol component | Mono-carboxylic acid component | Note | Melting point (° C.) |
|---|---|---|---|---|---|
| W3 | Kind | dipentaerythritol | myristic acid | — | 65 |
|  | Amount | 254 g (1.0 mol) | 1368 g (6.0 mol) | | |

TABLE 3-continued

| Wax | Alcohol component | Mono-carboxylic acid component | Note | Melting point (° C.) |
|---|---|---|---|---|
| w4 | — | — | paraffin wax "HNP-9" (manufactured by Nippon Seiro Co., Ltd.) | 77 |

[External Additive (Silica)]

The number average particle diameters of the commercially available external additives (silica) used in the examples are shown in Table 4.

TABLE 4

| | | Product name | Manufacturer | Number average particle diameter (nm) |
|---|---|---|---|---|
| Positively charged silica | P1 | TG-820F | Cabot Specialty Chemicals, Inc. | 8 |
| | P2 | MSP-012 | Tayca Corporation | 16 |
| | P3 | TG-7120 | Cabot Specialty Chemicals, Inc. | 20 |
| | P4 | NA 50Y | Nippon Aerosil Co., Ltd. | 30 |
| | P5 | MSP-016 | Tayca Corporation | 80 |
| Negatively charged silica | N1 | RY 50 | Nippon Aerosil Co., Ltd. | 40 |
| | N2 | NAX 50 | Nippon Aerosil Co., Ltd. | 30 |
| | N3 | R 972 | Nippon Aerosil Co., Ltd. | 16 |
| | N4 | RX 300 | Nippon Aerosil Co., Ltd. | 7 |
| | N5 | UFP-30H | Denka Co., Ltd. | 110 |

PRODUCTION EXAMPLES OF TONERS

Examples 1 to 19 and Comparative Examples 1 to 5

The predetermined amounts of the binder resin (i.e., the amorphous resin and the crystalline resin) and the release agent (i.e., the wax) shown in Table 5, and 2.0 parts by mass of a charge controlling agent "Bontron N-04" (manufactured by Orient Chemical Industries, Co., Ltd.), 5.0 parts by mass of a charge controlling resin "FCA-201PS" (manufactured by Fujikura Kasei Co., Ltd.), and 6.0 parts by mass of a colorant "Regal 330R" (manufactured by Cabot Specialty Chemicals, Inc.) were mixed with a Henschel mixer for 1 minutes, and then melt-kneaded with a co-rotation twin screw extruder "PCM-30" (diameter of screw: 2.9 cm, cross sectional area of screw: 7.06 cm², manufactured by Ikegai Corporation). The operation conditions of the co-rotation twin screw extruder were a barrel set temperature of 120° C., a screw rotation number of 200 rpm (rotational peripheral speed of screws: 0.30 m/sec), and a mixture feeding rate of 10 kg/h (mixture feeding amount per unit cross sectional area of screw: 1.42 kg/h·cm²).

The resulting resin kneaded product was cooled, coarsely pulverized with a pulverizer "Rotoplex" (manufactured by Hosokawa Micron Corporation), and sieved with a sieve having an aperture of 2 mm, so as to provide a coarsely pulverized product having a volume median particle diameter of 2 mm or less. The resulting coarsely pulverized product was finely pulverized with IDS-2 type Jet Mill (collision plate type, manufactured by Nippon Pneumatic Mfg. Co., Ltd.) while controlling the pulverizing pressure to make a volume median particle diameter of 7.5 μm. The resulting finely pulverized product was classified with DSX-2 type Airflow Classifier (manufactured by Nippon Pneumatic Mfg. Co., Ltd.) while controlling the static pressure (internal pressure) to make a volume median particle diameter ($D_{50}$) of 8.5 μm, so as to provide toner particles.

100 parts by mass of the resulting toner particles and the external additives (silica) of the kinds and the amounts shown in Table 5 were mixed with a Henschel mixer (manufactured by Nippon Coke & Engineering. Co., Ltd) at 2,100 rpm (peripheral speed: 29 m/sec) for 3 minutes to provide a toner.

The resulting toner was subjected to the following evaluations. The results are shown in Table 5.

Example 20

(Production of Aqueous Dispersion A-1)

150 g of the amorphous composite resin A1 and 75 g of ethyl acetate were charged in a vessel having a capacity of 3 L equipped with an agitator, a reflux condenser, a dropping funnel, a thermometer, and a nitrogen introduction tube, and were dissolved at 70° C. over 2 hours. To the resulting solution, a 20% by mass ammonia aqueous solution (pKa: 9.3) was added to make a neutralization degree of 100% by mol with respect to the acid value of the resin, followed by agitating for 30 minutes to provide a mixture. While retaining at 70° C., under agitation at 280 rpm (peripheral speed: 88 m/min), 675 g of ion exchanged water was added over 77 minutes to perform phase transition emulsification, thereby providing a crude dispersion of resin particles. While continuously retaining at 70° C., ethyl acetate was distilled off under reduced pressure to provide an aqueous dispersion of resin particles.

Thereafter, the aqueous dispersion was cooled to 30° C. under agitation at 280 rpm (peripheral speed: 88 m/min), with which 16.7 g of an anionic surfactant "Emal E27C" (sodium polyoxyethylene lauryl ether sulfate, solid content: 28% by mass, manufactured by Kao Corporation) was mixed and completely dissolved. Thereafter, the solid concentration of the aqueous dispersion was measured, and ion exchanged water was added thereto to control the solid concentration of the aqueous dispersion to 20% by mass. The resin particles in the resulting aqueous dispersion A-1 had a volume median particle diameter (DO of 214 nm.

(Production of Aqueous Dispersion C-1)

30 g of the crystalline resin C1 and 270 g of chloroform were mixed by agitation in a beaker having a capacity of 1 L to dissolve the crystalline resin C1 at 25° C., to which 100 g of Neopelex G-15 (manufactured by Kao Corporation) was added, and then the mixture was agitated with "T.K. Robomix" (manufactured by Primix Corporation) at a rotation number of 8,000 rpm for 30 minutes to prepare an emulsified liquid. Chloroform was distilled off from the resulting emulsified liquid under reduced pressure to provide an aqueous dispersion C-1. The resin particles in the resulting aqueous dispersion C-1 had a volume median particle diameter ($D_{50}$) of 299 nm, and the solid concentration was 23% by mass.

(Production of Colorant Dispersion Liquid)

50 g of a colorant "Regal 330R" (manufactured by Cabot Specialty Chemicals, Inc.), 10 g of a nonionic surfactant "Emulgen 150" (polyoxyethylene lauryl ether, manufactured by Kao Corporation), and 200 g of ion exchanged water were mixed and dispersed with a homogenizer for 10 minutes, so as to provide a colorant dispersion liquid containing colorant particles. The colorant particles had a volume median particle diameter ($D_{50}$) of 130 nm, and the solid concentration was 22% by mass.

(Production of Charge Controlling Agent Dispersion Liquid)

50 g of a charge controlling agent "Bontron N-04" (manufactured by Orient Chemical Industries, Co., Ltd.), 5 g of a nonionic surfactant "Emulgen 150" (manufactured by Kao Corporation), and 200 g of ion exchanged water were mixed and dispersed with a sand grinder using glass beads for 10 minutes, so as to provide a charge controlling agent dispersion liquid containing charge controlling agent particles. The charge controlling agent particles had a volume median particle diameter ($D_{50}$) of 421 nm, and the solid concentration was 22% by mass.

(Production of Charge Controlling Resin Dispersion Liquid)

30 g of a charge controlling resin "FCA-201PS" (manufactured by Fujikura Kasei Co., Ltd.) and 270 g of chloroform were mixed by agitation in a beaker having a capacity of 1 L to dissolve the charge controlling resin at 25° C., to which 100 g of Neopelex G-15 (manufactured by Kao Corporation) was added, and then the mixture was agitated with "T.K. Robomix" (manufactured by Primix Corporation) at a rotation number of 8,000 rpm for 30 minutes, during which 20 g of ion exchanged water was added thereto, so as to prepare an emulsified liquid. Chloroform was distilled off from the resulting emulsified liquid under reduced pressure to provide a charge controlling resin dispersion liquid. The charge controlling resin particles in the resulting charge controlling resin dispersion liquid had a volume median particle diameter ($D_{50}$) of 321 nm, and the solid concentration was 20% by mass.

(Production of Release Agent Particle Dispersion Liquid)

3.8 g of a sodium acrylate-sodium maleate copolymer aqueous solution "Poiz 521" (effective concentration: 40% by mass, manufactured by Kao Corporation) as a sodium polycarboxylate aqueous solution was dissolved in 200 g of ion exchanged water in a beaker having a capacity of 1 L, to which 50 g of the release agent W1 was then added and melted by retaining the temperature to 90 to 95° C. under agitation, during which a dispersion treatment was performed with an ultrasonic homogenizer "US-600T" (manufactured by Nippon Seiki Co., Ltd.) for 30 minutes. Thereafter, the mixture was cooled to room temperature, to which ion exchanged water was added to control the solid content of the release agent to 20% by mass, so as to provide a release agent particle dispersion liquid. The release agent particles in the release agent particle dispersion liquid had a volume median particle diameter ($D_{50}$) of 423 nm.

(Production of Toner)

315.3 g of the aqueous dispersion A-1, 8.5 g of the aqueous dispersion C-1, 17.7 g of the colorant dispersion liquid, 9.8 g of the release agent dispersion liquid, 3.2 g of the charge controlling agent dispersion liquid, 16.3 g of the charge controlling resin dispersion liquid, and 60 g of ion exchanged water were placed in a vessel having a capacity of 3 L, and 150 g of a 0.1% by mass calcium chloride aqueous solution was added dropwise thereto at 20° C. under agitation of 100 rpm (peripheral speed: 31 m/min) with an anchor-type stirrer. Thereafter, the mixture was heated to 50° C. under agitation. After the volume median particle diameter reached 8.5 μm, a diluted liquid obtained by diluting 4.2 g of an anionic surfactant "Emal E27C" (solid content: 28% by mass, manufactured by Kao Corporation) with 37 g of ion exchanged water was added to provide an aggregate X. Subsequently, the temperature was increased to 80° C., and after retaining at 80° C. for 1 hour from the time when the temperature became 80° C., the heating was terminated. Fused particles were formed by the procedures, and then were gradually cooled to 20° C., filtered through a metal mesh of 150 mesh (aperture: 150 μm), then suction-filtered, and subjected to rinsing and drying steps, so as to provide toner particles.

The external addition treatment was performed in the same manner as in Example 1 to provide a toner.

The resulting toner was subjected to the following evaluations. The results are shown in Table 5.

Test Example 1 (Low-Temperature Fusing Property)

The toner was charged in a printer "HL-2040" (manufactured by Brother Industries, Ltd.) having been modified to enable to provide an unfused image, and a solid image of 2 cm square as an unfused image was printed. By using an external fusing device obtained by modifying "Oki Micorline 3010" (manufactured by Oki Data Corporation), in which the rotation speed of the fusing roll was 100 mm/sec, and the temperature of the fusing roll was increased from 100° C. to 230° C. by 5° C., the unfused image was subjected to a fusing treatment at those temperatures to provide fused images. An adhesive tape, Mending Tape (manufactured by Sumitomo 3M, Ltd.), was adhered to each of the fused images obtained at those temperatures, and then the tape was sufficiently attached to the fused image by placing a cylindrical weight of 500 g thereon. Thereafter, Mending Tape was slowly peeled off from the fused image. The image densities before and after peeling were measured with an image density measurement apparatus "Gretag SPM50" (manufactured by GretagMachbeth GmbH), and the temperature at which the image density ratio before and after wearing ((image density after wearing/image density before wearing)×100) firstly exceeded 90% was designated as the minimum fusing temperature, which was used as an index of the low-temperature fusing property. A smaller value thereof means better low-temperature fusing property. The results are shown in Table 5.

Test Example 2 (Black Solid Image Uniformity)

A tool capable of idling a cartridge of a printer "HL-2040" (manufactured by Brother Industries, Ltd.) was produced, and while the printer was idled at 150 rpm under condition of a temperature of 10° C. and a humidity of 20%, an A-4 size black solid image was printed every 30 minutes. The printing medium used was J Paper (manufactured by Fuji Xerox Co., Ltd.). The image density (ID1) at the center portion at 5 cm from the upper end of the black solid image and the image density (ID2) at the center portion at 5 cm from the lower end thereof were measured with an image density measurement apparatus "Gretag SPM50" (manufactured by GretagMachbeth GmbH), and the difference between them (i.e., ID1 and ID2) was confirmed. The idling time at which the difference of the image densities exceeded 0.4 was designated as the evaluation result of the black solid image uniformity. In the case where the difference of the image densities did not exceed 0.4, the idling time was extended by 30 minutes each, and the difference of the image densities was evaluated in the same manner. In the case where the difference of the image densities did not exceed 0.4 even after the idling time of 4 hours, the result is shown by "4.0<". The results are shown in Table 5.

TABLE 5

| | Binder resin | | | | Release agent (wax) | | Positively charged silica | | Negatively charged silica | | Toner capability | |
| | Amorphous resin | | Crystalline resin | | | | | | | | Low-temperature fusing property (° C.) | Black solid image uniformity (h) |
| | Kind | Part by mass | Kind | Part by mass | Kind | Part by mass | Kind | Part by mass | Kind | Part by mass | | |
|---|---|---|---|---|---|---|---|---|---|---|---|---|
| Example 1 | A1 | 97 | C1 | 3 | W1 | 8 | P1 | 2.0 | N1 | 1.0 | 140 | 4.0< |
| Example 2 | A1 | 97 | C1 | 3 | W1 | 3 | P1 | 2.0 | N2 | 1.0 | 140 | 4.0 |
| Example 3 | A1 | 97 | C1 | 3 | W1 | 2 | P1 | 2.0 | N3 | 1.0 | 140 | 3.5 |
| Example 4 | A1 | 97 | C1 | 3 | W1 | 3 | P2 | 2.0 | N1 | 1.0 | 140 | 4.0< |
| Example 5 | A1 | 97 | C1 | 3 | W1 | 8 | P3 | 2.0 | N1 | 1.0 | 140 | 3.5 |
| Example 6 | A1 | 97 | C1 | 3 | W1 | 3 | P4 | 2.0 | N1 | 1.0 | 140 | 3.0 |
| Example 7 | A1 | 97 | C1 | 3 | W2 | 3 | P1 | 2.0 | N1 | 1.0 | 140 | 4.0< |
| Example 8 | A1 | 97 | C1 | 3 | W3 | 3 | P1 | 2.0 | N1 | 1.0 | 135 | 4.0 |
| Example 9 | A2 | 97 | C1 | 3 | W1 | 3 | P1 | 2.0 | N1 | 1.0 | 140 | 4.0< |
| Example 10 | A1 | 97 | C2 | 3 | W1 | 8 | P1 | 2.0 | N1 | 1.0 | 140 | 3.5 |
| Example 11 | A1 | 97 | C3 | 3 | W1 | 3 | P1 | 2.0 | N1 | 1.0 | 145 | 3.0 |
| Example 12 | A1 | 90 | C3 | 10 | W1 | 2 | P1 | 2.0 | N1 | 1.0 | 140 | 3.0 |
| Example 13 | A1 | 97 | C1 | 3 | W1 | 1.5 | P1 | 2.0 | N1 | 1.0 | 145 | 4.0< |
| Example 14 | A1 | 97 | C1 | 3 | W1 | 6 | P1 | 2.0 | N1 | 1.0 | 135 | 3.5 |
| Example 15 | A1 | 97 | C1 | 3 | W1 | 3 | P1 | 1.0 | N1 | 1.0 | 140 | 3.5 |
| Example 16 | A1 | 97 | C1 | 3 | W1 | 3 | P1 | 2.5 | N1 | 0.5 | 140 | 3.5 |
| Example 17 | A1 | 97 | C1 | 3 | W1 | 3 | P1 P5 | 2.0 0.5 | N1 | 1.0 | 140 | 4.0< |
| Example 18 | A1 | 97 | C1 | 3 | W1 | 3 | P1 | 2.0 | N1 N3 | 1.0 0.5 | 140 | 4.0< |
| Example 19 | A1 | 97 | C1 | 3 | W1 w4 | 2 1 | P1 | 2.0 | N1 | 1.0 | 140 | 4.0 |
| Example 20 | A1 | 97 | C1 | 3 | W1 | 3 | P1 | 2.0 | N1 | 1.0 | 145 | 2.5 |
| Comparative Example 1 | A1 | 97 | C1 | 3 | w4 | 3 | P1 | 2.0 | N1 | 1.0 | 150 | 2.0 |
| Comparative Example 2 | A1 | 97 | C1 | 3 | W1 | 8 | P5 | 2.0 | N1 | 1.0 | 140 | 1.5 |
| Comparative Example 3 | A1 | 97 | C1 | 3 | W1 | 2 | P1 | 2.0 | N4 | 1.0 | 140 | 2.0 |
| Comparative Example 4 | A1 | 97 | C1 | 3 | W1 | 3 | P1 | 2.0 | N5 | 1.0 | 145 | 2.0 |
| Comparative Example 5 | A1 | 97 | C1 | 3 | W1 | 3 | P1 P3 | 2.0 1.0 | — | — | 140 | 2.0 |

It is understood from Table 5 that the positively charged toner for development of an electrostatic image of the present invention is excellent in both the low-temperature fusing property and the black solid image uniformity.

INDUSTRIAL APPLICABILITY

The positively charged toner for development of an electrostatic image of the present invention is excellent in both the low-temperature fusing property and the black solid image uniformity, and therefore can be favorably applied to development of a latent image formed in an electrophotographic method, an electrostatic recording method, an electrostatic printing method, and the like.

The invention claimed is:
1. A positively charged toner, comprising matrix particles comprising a binder resin and a release agent and being coated with inorganic fine particles, wherein:
the binder resin comprises a crystalline resin, wherein a content of the crystalline resin is from 1% by mass to 30% by mass based on 100% by mass of the total amount of the binder resin,
the release agent comprises ester wax (W) comprising a dipentaerythritol unit as a constitutional component, wherein a content of the release agent is from 1 part by mass to 10 parts by mass, per 100 parts by mass in the total of the binder resin, and a content of the ester wax (W) in the release agent is 60% by mass or more based on the release agent as 100% by mass, and
the inorganic fine particles comprise positively charged silica (S1) and negatively charged silica (S2),
provided that the positively charged silica (S1) has an average particle diameter that is smaller than an average particle diameter of the negatively charged silica (S2), and the negatively charged silica (S2) has an average particle diameter of from 10 nm to 90 nm.

2. The positively charged toner according to claim 1, which has a mass ratio of the negatively charged silica (S2) to the total mass of the positively charged silica (S1) and the negatively charged silica (S2) (negatively charged silica (S2)/(positively charges silica (S1)+negatively charged silica (S2)) of from 0.1 to 0.5.

3. The positively charged toner according to claim 1, which has a mass ratio of the release agent to the binder resin (release agent/binder resin) of from 0.001 to 0.3.

4. The positively charged toner according to claim 1, wherein the ester wax (W) is an ester condensate of dipentaerythritol and an aliphatic monocarboxylic acid.

5. The positively charged toner according to claim 4, wherein the aliphatic monocarboxylic acid is a linear aliphatic monocarboxylic acid having from 8 to 30 carbon atoms.

6. The positively charged toner according to claim 4, wherein the aliphatic monocarboxylic acid is at least one selected from the group consisting of palmitic acid and stearic acid.

7. The positively charged toner according to claim 1, wherein the ester wax (W) has a melting point of from 60° C. to 150° C.

8. The positively charged toner according to claim 1, wherein the crystalline resin is at least one selected from the group consisting of a crystalline polyester resin and a crystalline composite resin having a polyester resin segment and an addition polymer resin segment.

9. The positively charged toner according to claim 8, wherein the crystalline resin comprises a crystalline composite resin, and the crystalline composite resin has a mass ratio of the polyester resin segment and the addition polymer resin segment (polyester resin segment/addition polymer resin segment) of from 60/40 to 95/5.

10. The positively charged toner according to claim 1, wherein the binder resin further comprises an amorphous resin, and the amorphous resin is at least one kind of a resin selected from the group consisting of a styrene-acrylic resin, an amorphous polyester resin, and an amorphous composite resin having a polyester resin segment and an addition polymer resin segment.

11. The positively charged toner according to claim 10, wherein the amorphous resin is an amorphous composite resin having a polyester resin segment and an addition polymer resin segment.

12. The positively charged toner according to claim 1, wherein the positively charged silica (S1) has an average particle diameter of from 3 nm to 40 nm.

13. The positively charged toner according to claim 1, further comprising a charge controlling resin.

14. The positively charged toner according to claim 1, wherein the crystalline resin is a crystalline composite resin having a polyester resin segment and an addition polymer resin segment.

15. The positively charged toner according to claim 1, wherein the crystalline resin comprises an aliphatic diol having from 9 to 14 carbon atoms as an alcohol component and an aliphatic dicarboxylic acid compound having from 9 to 14 carbon atoms as a carboxylic acid component.

16. The positively charged toner according to claim 1, wherein the crystalline resin has a melting point of from 65° C. to 150° C.

17. The positively charged toner according to claim 1, wherein a content of the inorganic fine particles is from 0.1 part by mass to 5 parts by mass per 100 parts by mass of the matrix particles.

18. The positively charged toner according to claim 1, wherein the content of the crystalline resin is from 2% by mass to 15% by mass or less based on 100% by mass of the total amount of the binder resin.

19. The positively charged toner according to claim 1, wherein a melting point of the ester wax (W) to from 60° C. to 100° C.

20. The positively charged toner according to claim 1, wherein a melting point of the crystalline resin to from 70° C. to 120° C.

* * * * *